(12) United States Patent
Li et al.

(10) Patent No.: US 12,200,157 B2
(45) Date of Patent: Jan. 14, 2025

(54) MOBILE TERMINAL

(71) Applicant: Huawei Technologies Co., Ltd., Shenzhen (CN)

(72) Inventors: Shizhe Li, Shanghai (CN); Jing Chang, Shanghai (CN); Yang Liu, Shanghai (CN); Tienan Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 431 days.

(21) Appl. No.: 17/761,888

(22) PCT Filed: Sep. 15, 2020

(86) PCT No.: PCT/CN2020/115263
§ 371 (c)(1),
(2) Date: Mar. 18, 2022

(87) PCT Pub. No.: WO2021/052308
PCT Pub. Date: Mar. 25, 2021

(65) Prior Publication Data
US 2022/0337689 A1  Oct. 20, 2022

(30) Foreign Application Priority Data
Sep. 18, 2019 (CN) .......... 201921553400.X

(51) Int. Cl.
*H04M 1/03* (2006.01)
*H04M 1/02* (2006.01)
(Continued)

(52) U.S. Cl.
CPC ......... *H04M 1/035* (2013.01); *H04M 1/0202* (2013.01); *H04M 1/18* (2013.01); *H04R 9/06* (2013.01)

(58) Field of Classification Search
CPC ........ H04M 1/02; H04M 1/0202; H04M 1/03; H04M 1/035; H04M 1/18; H04M 1/19; H04R 9/00; H04R 9/06
See application file for complete search history.

(56) References Cited

U.S. PATENT DOCUMENTS 9,414,140 B2 * 8/2016 Wang .................... H04R 1/021
10,225,645 B1 * 3/2019 Lv ......................... H04R 1/021
(Continued)

FOREIGN PATENT DOCUMENTS

| CN | 204539390 U | 8/2015 |
| CN | 205510154 U | 8/2016 |

(Continued)

OTHER PUBLICATIONS

CN108322864A—English Machine Translation, "A Sound Device And Mobile Terminal", Pang et al., Jul. 24, 2018. (Year: 2018).*
(Continued)

*Primary Examiner* — Quochien B Vuong
(74) *Attorney, Agent, or Firm* — Conley Rose, P.C.

(57) ABSTRACT

A mobile terminal includes a housing and a speaker component including a speaker unit that divides a cavity of the speaker component into a front speaker box and a rear speaker box, an air vent coupled to an inner cavity of the housing is disposed on a wall of the rear speaker box, and a flexible sound absorbing member that can absorb a sound and damp vibration is disposed on a wall of the inner cavity of the housing.

20 Claims, 10 Drawing Sheets

(51) Int. Cl.
*H04M 1/18* (2006.01)
*H04R 9/06* (2006.01)

(56) References Cited

U.S. PATENT DOCUMENTS

| | | | |
|---|---|---|---|
| 10,674,276 B2 * | 6/2020 | Chen | H04R 1/021 |
| 2008/0310670 A1 * | 12/2008 | Itakura | H04R 9/06 |
| | | | 381/412 |
| 2011/0048844 A1 | 3/2011 | Papakyriacou | |
| 2017/0041703 A1 | 2/2017 | Herold et al. | |
| 2017/0289674 A1 | 10/2017 | Shi | |
| 2018/0020273 A1 | 1/2018 | Li et al. | |
| 2018/0213319 A1 | 7/2018 | Qin | |
| 2021/0120343 A1 | 4/2021 | Zhang et al. | |
| 2022/0337689 A1 | 10/2022 | Li et al. | |

FOREIGN PATENT DOCUMENTS

| | | | | |
|---|---|---|---|---|
| CN | 106453759 A | | 2/2017 | |
| CN | 107360516 A | | 11/2017 | |
| CN | 107623886 A | | 1/2018 | |
| CN | 207070349 U | | 3/2018 | |
| CN | 108322864 A | * | 7/2018 | ............... H04R 9/02 |
| CN | 210724969 U | | 6/2020 | |
| EP | 1868410 A1 | | 12/2007 | |
| WO | 2016141740 A1 | | 9/2016 | |
| WO | 2019161700 A1 | | 8/2019 | |
| WO | WO-2019154359 A1 | * | 8/2019 | ............... H04R 1/02 |

OTHER PUBLICATIONS

WO2019154359A1—English Text, "Loudspeaker Assembly And Electronic Device", Cai et al., Aug. 15, 2019. (Year: 2019).*

* cited by examiner

MOBILE TERMINAL

CROSS-REFERENCE TO RELATED APPLICATIONS

This is a U.S. National Stage of International Patent Application No. PCT/CN2020/115263 filed on Sep. 15, 2020, which claims priority to Chinese Patent Application No. 201921553400.X filed on Sep. 18, 2019. Both of the aforementioned applications are hereby incorporated by reference in their entireties.

TECHNICAL FIELD

This application relates to the field of mobile terminals, and in particular, to a mobile terminal.

BACKGROUND

Currently, a waterproof requirement on a mobile terminal such as a mobile phone is increasingly high. Therefore, a complete structure of the mobile phone forms a closed cavity, and therefore has relatively strong air tightness.

Currently, to improve an acoustic indicator such as a volume of a speaker of the mobile phone, a rear box of the speaker of the mobile phone may form an open or semi-open structure. Specifically, a front box and the rear box of the speaker are isolated from each other by using a speaker unit 21, and the rear box of the speaker is connected to an inner cavity of the mobile phone. In this case, because the front box and the rear box of the speaker are usually sealed and isolated from each other, and the inner cavity of the mobile phone is a closed cavity, the inner cavity of the mobile phone is still a closed cavity and has a relatively good sealing effect.

However, because the inner cavity of the mobile phone is a closed cavity, as the speaker unit 21 vibrates and sounds, the rear box of the speaker may generate, under the action of the vibration, an airflow jetted to the inner cavity of the mobile phone. When a structure of a housing, such as a rear cover, of the mobile phone is impacted on by the airflow, a resonance phenomenon is prone to occur, causing discomfort for a user.

SUMMARY

This application provides a mobile terminal. The mobile terminal can vibrate at a relatively small amplitude when playing a sound.

According to a first aspect, this application provides a mobile terminal, including a housing and a speaker component disposed in an inner cavity of the housing. The speaker component includes a speaker unit and a hollow accommodating cavity, the speaker unit is disposed in the accommodating cavity and divides the accommodating cavity into a front speaker box and a rear speaker box, the front speaker box is connected to a sound output hole of the housing, an air vent connected to the inner cavity is disposed on a wall of the rear speaker box, and a flexible sound absorbing member is disposed on a wall of the inner cavity of the housing.

In this way, the flexible sound absorbing member is disposed in the inner cavity of the housing of the mobile terminal, and the flexible sound absorbing member is located in the inner cavity of the housing, to fill a part of space of the inner cavity of the housing, so that the inner cavity of the housing is equivalent to a "solid" structure. In this case, the space of the inner cavity of the housing is substantially compressed. When flowing in the inner cavity, an airflow continuously collides with a surface or an inner structure of the flexible sound absorbing member and is impeded by the flexible sound absorbing member. Energy of the airflow is attenuated under an impedance action of the flexible sound absorbing member. When the airflow encounters the surface of the flexible sound absorbing member, impact energy of the airflow may also be attenuated through deformation buffering of the flexible sound absorbing member. In this way, the flexible sound absorbing member can impede movement of the airflow, so that the energy of the airflow can be attenuated.

In addition, when the flexible sound absorbing member is disposed in the inner cavity of the housing, the flexible sound absorbing member may be in contact with at least a part of the wall of the inner cavity. Because the flexible sound absorbing member has specific elasticity, the flexible sound absorbing member may be supported on the wall by using an elastic force of the flexible sound absorbing member, so that walls on two sides of the inner cavity of the housing are supported by the flexible sound absorbing member. In this way, under the support of the flexible sound absorbing member, an inherent frequency of the entire housing is improved, so that the inherent frequency falls outside a vibration frequency range of an airflow generated by the speaker component during vibration, thereby damping vibration of the housing.

In an optional implementation, the mobile terminal further includes a bracket component located inside the housing. The bracket component includes a bracket and a circuit element disposed on the bracket, the speaker component is disposed on the bracket component, and the flexible sound absorbing member is disposed between the bracket component and an inner wall of the housing. The bracket component of the mobile terminal may serve as a main body in the mobile terminal and occupy a part of the space in the inner cavity, so that the flexible sound absorbing member can be disposed in a part of space jointly enclosed by the bracket component and the inner wall of the housing.

In an optional implementation, two opposite sides of the flexible sound absorbing member respectively abut against the bracket component and the inner wall of the housing. In this way, after the wall of the inner cavity of the housing is supported by the flexible sound absorbing member, it is equivalently that a support point is added to the original cavity of the housing. When the housing vibrates, an acting force of the housing is also transmitted to the bracket component by using the flexible sound absorbing member, and the housing is affected by a reverse support force of the bracket component. Therefore, an inherent vibration frequency of the entire housing changes. When an airflow of the speaker component passes through the inner cavity of the housing, an inherent frequency of the housing falls outside a vibration frequency range of the airflow, so that an amplitude of the housing decreases, thereby damping vibration of the entire mobile terminal.

In an optional implementation, at least one of the inner wall of the housing and the bracket component is adhered to the flexible sound absorbing member. In this way, the flexible sound absorbing member is fastened in an adhesive manner, without a need to dispose a fastening apparatus or a fastening structure on the housing or the bracket component, so that an inner structure of the housing is relatively simple, thereby effectively reducing structural complexity of the housing and the bracket component, and reducing production costs.

In an optional implementation, the flexible sound absorbing member is disposed adjacent to the air vent. In this way, after flowing out from the air vent, an airflow can be buffered by the flexible sound absorbing member, thereby reducing a speed and impact of the airflow.

In an optional implementation, the air vent faces the flexible sound absorbing member. In this way, there is no other structure between the flexible sound absorbing member and the air vent for impeding. Therefore, an airflow flowing in/out from the air vent can be relatively smoothly blown to the flexible sound absorbing member, and impeded and buffered by the flexible sound absorbing member.

In an optional implementation, the air vent may face a side edge of the flexible sound absorbing member. In this way, an airflow blown out from the air vent may be blown to the edge of the flexible sound absorbing member, enter the flexible sound absorbing member from a side of the flexible sound absorbing member, and rub against and collide with the inner structure of the flexible sound absorbing member, so that energy is attenuated, thereby damping impact and vibration of the airflow on the housing. Alternatively, the air vent may face a front surface of the flexible sound absorbing member. In this way, the flexible sound absorbing member can buffer an airflow when the airflow is just blown out of the air vent, thereby directly impeding the airflow.

In an optional implementation, the housing includes a rear cover, and the flexible sound absorbing member is attached to an inner wall of the rear cover. In this way, because the rear cover forms a main resonance component in the housing, the flexible sound absorbing member may be disposed corresponding to the rear cover, to damp vibration of the rear cover.

In an optional implementation, the flexible sound absorbing member is located in a middle region of the rear cover. Because deflection of the central region of the rear cover is relatively large, the rear cover is deformed at a relatively large degree when being impacted on by a sound wave and an airflow, causing a relatively large amplitude. Therefore, the flexible sound absorbing member is disposed in the middle region of the rear cover, so that the flexible sound absorbing member has a relatively good buffering and support effect.

In an optional implementation, the circuit element includes a battery, the battery is disposed on the bracket and the battery faces the inner wall of the rear cover, and the flexible sound absorbing member is disposed between the battery and the inner wall of the rear cover. Because the battery occupies a middle region of the mobile terminal, and an outer wall of the battery has a relatively flat surface with a relatively large area, the flexible sound absorbing member can firmly support the inner wall of the rear cover when being disposed between the battery and the rear cover.

In an optional implementation, the flexible sound absorbing member covers a surface that is of the battery and that faces the inner wall of the rear cover. Because the battery occupies relatively large space inside the housing of the mobile terminal, a relatively large part of region in the inner cavity of the housing can be covered by the flexible sound absorbing member, so that the flexible sound absorbing member implements a relatively good buffering and vibration damping function.

In an optional implementation, the flexible sound absorbing member has a porous structure. In this way, the flexible sound absorbing member can enable, by using the porous structure of the flexible sound absorbing member, an impact airflow to enter inner holes and collide with and rub against walls of the holes, so that kinetic energy of the airflow is converted into thermal energy through rubbing between the airflow and the flexible sound absorbing member, thereby attenuating energy of the impact airflow. Therefore, the flexible sound absorbing member can further damp impact of the airflow on the housing, thereby damping vibration of the housing.

In an optional implementation, the flexible sound absorbing member is sound absorbing cotton. There are a relatively large quantity of gaps and micro voids inside the sound absorbing cotton. When an external sound wave enters the micro voids of the flexible sound absorbing member, air in the micro voids vibrates, to convert a part of sound energy and airflow kinetic energy into thermal energy, to achieve a sound absorbing function. In addition, when the sound absorbing cotton is used as the flexible sound absorbing member, because the sound absorbing cotton has a relatively good damping capability for external impact and vibration, an airflow generated because the speaker component sounds can be relatively well buffered and attenuated, thereby improving an anti-vibration capability of the mobile terminal. In addition, because the sound absorbing cotton has relatively strong height tolerance, structural connection between parts of the housing is not adversely affected.

In an optional implementation, a dust filter covers the air vent. In this way, different dust filter forms may be used, for example, different mesh diameters may be set, to change a structure and a cross-sectional area of the air vent, and correspondingly adjust an acoustic indicator such as acoustic impedance of the speaker component during sounding, thereby improving a sound output effect of the mobile terminal. In addition, the dust filter may also be configured to block impurities such as dust, so that the rear speaker box of the speaker component is isolated from the inner cavity of the housing, thereby preventing the speaker box inside the speaker component from being affected by dust.

In an optional implementation, an area of the air vent is greater than or equal to 10 $mm^2$. In this way, the speaker component may have a relatively large volume and relatively large loudness.

In an optional implementation, the bracket component is adhered to the inner wall of the rear cover by using an adhesive substance. The adhesive substance includes at least one of a first adhesive substance and a second adhesive substance, the first adhesive substance is located in an edge region of the rear cover, and the second adhesive substance is connected between the speaker component and the rear cover. In this way, connection between the rear cover and another component can be enhanced by using the adhesive substance, to help improve rigidity and support strength of the entire rear cover, and change a vibration frequency of the housing, so that the vibration frequency falls outside a sound wave and airflow frequency range of the speaker component, thereby damping vibration of the housing.

In an optional implementation, the rear cover includes a plane region and an arc surface region surrounding a peripheral edge of the plane region, the first adhesive substance is disposed in the plane region, and a boundary line between the plane region and the arc surface region is adjacent to the first adhesive substance. In this case, the plane region of the rear cover is conveniently fastened to the first adhesive substance through adhering, and an adhering position of the first adhesive substance is located on an outermost side of the plane region of the rear cover. Therefore, the first adhesive substance has a relatively good support effect for the rear cover.

In an optional implementation, the first adhesive substance is disposed around a circumferential direction of the rear cover; or there are a plurality of first adhesive substances, and the plurality of first adhesive substances are separately distributed in different directions in a circumferential direction of the rear cover. In this way, the circumferential direction of the entire rear cover is supported by the first adhesive substance, so that a relatively good anti-vibration effect can be achieved.

The mobile terminal in this application specifically includes the housing and the speaker component disposed in the inner cavity of the housing. The speaker component includes the speaker unit and the hollow accommodating cavity, the speaker unit is disposed in the accommodating cavity and divides the accommodating cavity into the front speaker box and the rear speaker box, the front speaker box is connected to the sound output hole of the housing, the air vent connected to the inner cavity is disposed on the wall of the rear speaker box, and the flexible sound absorbing member is disposed on the wall of the inner cavity of the housing. In this way, the flexible sound absorbing member can buffer an airflow generated when the speaker component sounds, thereby damping vibration of the housing.

DESCRIPTION OF REFERENCE SIGNS

Figure 1:
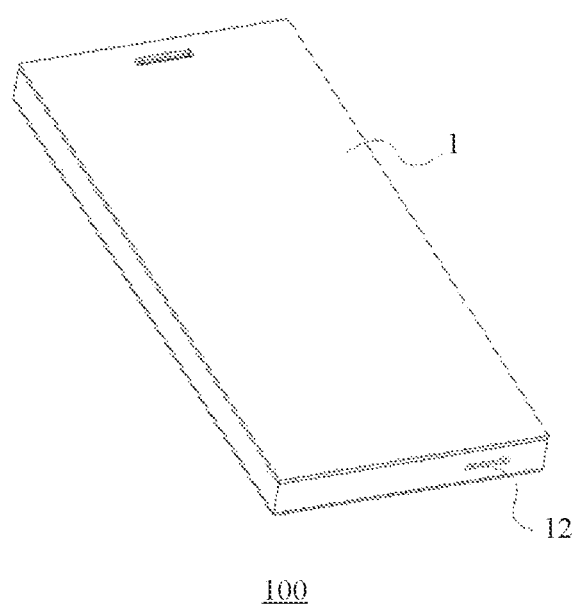
FIG. 1 is a schematic diagram of a structure of a mobile terminal according to an embodiment of this application.

1—housing; 2—speaker component; 3—bracket component; 4—flexible sound absorbing member; 5—adhesive substance; 11—inner cavity; 12—sound output hole; 13—rear cover; 14—middle frame; 21—speaker unit; 22—accommodating cavity; 31—bracket; 32—battery; 51—first adhesive substance; 52—second adhesive substance; 131—plane region; 132—arc surface region; 221—front speaker box; 222—rear speaker box; 223—air vent; 100—mobile terminal; 110—RF unit; 120—memory; 130—another input device; 140—screen; 141—display panel; 142—touch panel; 150—sensor; 160—audio circuit; 170—I/O subsystem; 171—another input device controller; 172—sensor controller; 173—display controller; 180—processor; 190—power supply; 200—antenna; 2231—dust filter; and 2232—back adhesive.

DESCRIPTION OF EMBODIMENTS

Before the embodiments of this application are described, for ease of understanding, terms in the embodiments of this application are first explained.

Speaker: The speaker is also referred to as a "loudspeaker", and is a common electroacoustic transducer. A main working principle of the speaker is using an electrified element to drive a diaphragm to mechanically vibrate, and push surrounding air to make an air medium fluctuate, to implement "electricity-force-sound" conversion.

Speaker box: The speaker box mainly includes components such as a front speaker box and a rear speaker box. The front speaker box and the rear speaker box are respectively disposed on two opposite sides of a diaphragm of a speaker. The front speaker box is located on a sound output side of the speaker and is connected to a sound output hole, so that a sound of the speaker is propagated to the outside by using the front speaker box. The rear speaker box is located on a side that is of the speaker and that is opposite to the sound output side. The rear speaker box mainly affects a low-frequency part of the sound, and can improve a sound field and loudness of the speaker.

To achieve a relatively good waterproof sealing capability, a closed cavity may be formed inside a housing of a mobile terminal such as a mobile phone, that is, an inner cavity of the housing is not connected to the outside of the mobile phone. To achieve relatively good sealing inside the housing of the mobile phone, sealing structures are disposed at various openings and interfaces outside the mobile phone. For example, for a speaker, a sealing structure may be disposed at a sound output hole of the speaker, or sealing is implemented between a diaphragm of the speaker and another structure of the speaker, so that a rear speaker box is isolated from an external environment of the mobile phone.

To improve acoustic indicators such as loudness and a sound field of the speaker of the mobile phone, the speaker of the mobile phone may have an open or semi-open rear speaker box. In this case, a relatively large opening is disposed in the rear speaker box, and the rear speaker box is connected to the inner cavity of the housing by using the opening. However, when the speaker sounds, vibration of the diaphragm pushes movement of air in the rear speaker box. In this way, the air in the rear speaker box expands and flows to the inner cavity of the housing from the opening in the rear speaker box, or contracts to enable air in the inner cavity of the housing to enter the rear speaker box from the opening. In this case, an airflow thereby generated impacts on the inner cavity of the housing of the mobile phone. In addition, the inner cavity of the housing is a closed cavity. Therefore, inner space of the inner cavity correspondingly vibrates under the impact of the airflow, and the vibration is transferred to a structure such as the housing of the mobile phone, affecting holding and normal operation of a user.

In this case, a mobile terminal provided in this application can reduce cases in which an inner cavity of a housing of a mobile phone vibrates due to impact of an airflow, to avoid affecting holding of a user.

Figure 2:
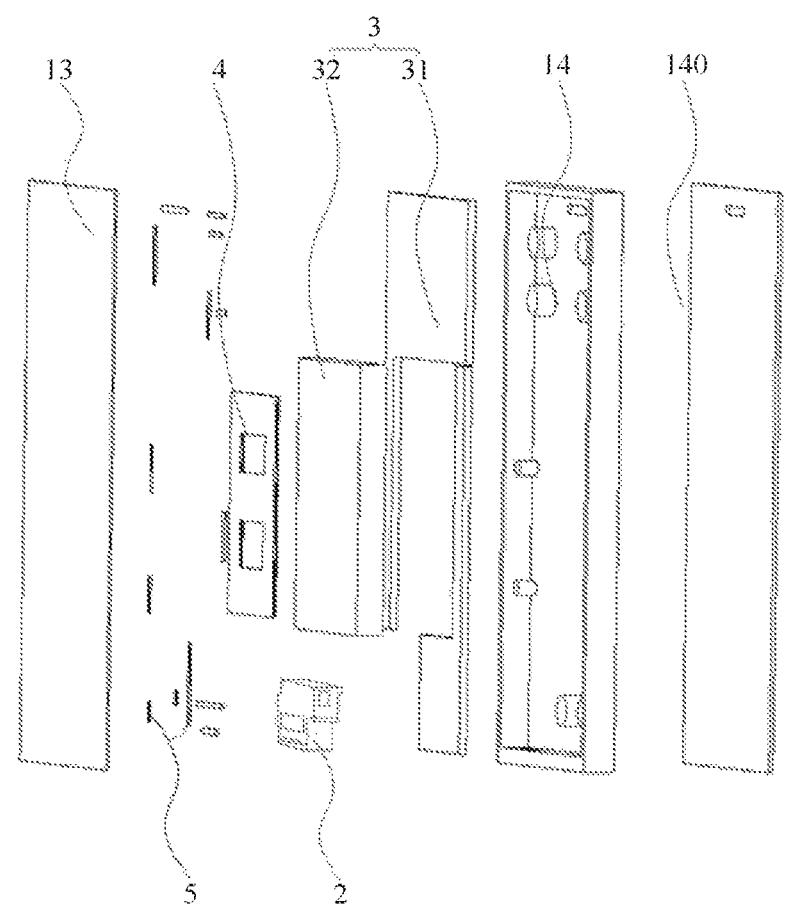
FIG. 2 is a schematic exploded diagram of the mobile terminal in FIG. 1.

FIG. 1 is a schematic diagram of a structure of a mobile terminal according to an embodiment of this application. FIG. 2 is a schematic exploded diagram of the mobile terminal in FIG. 1. As shown in FIG. 1 and FIG. 2, the mobile terminal provided in this embodiment specifically includes a housing 1 and a speaker component 2 disposed in an inner cavity 11 of the housing 1, and a flexible sound absorbing member 4 is disposed on a wall of the inner cavity 11 of the housing 1.

The mobile terminal in this embodiment may include but is not limited to a mobile phone, a tablet computer, a personal digital assistant (Personal Digital Assistant, PDA), a point of sale (Point of Sales, POS), a vehicle-mounted computer, or the like. In this embodiment, a mobile phone is used as an example for description.

Figure 3:
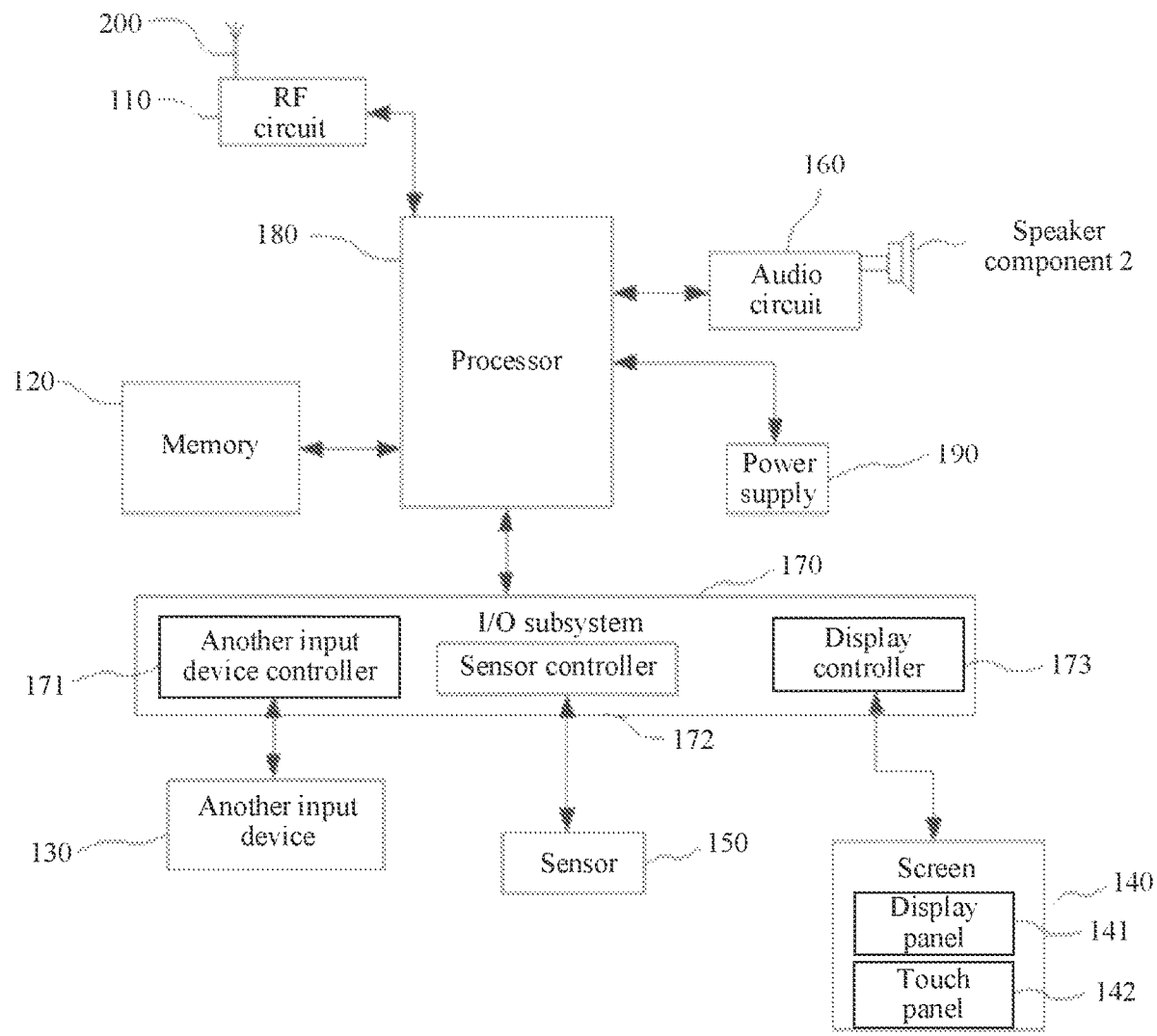
FIG. 3 is a block diagram of some inner structures of the mobile terminal shown in FIG. 1 in a case in which the mobile terminal is a mobile phone.

Specifically, in addition to the housing 1 and the speaker component 2, the mobile terminal in this embodiment may further include other components and structures, and these components and structures are partially or completely disposed in the housing. Specifically, an example in which the mobile terminal is a mobile phone is used for description. FIG. 3 is a block diagram of some inner structures of the mobile terminal shown in FIG. 1 in a case in which the mobile terminal is a mobile phone. As shown in FIG. 3, in addition to a housing 1 and a speaker component 2, a mobile terminal 100 includes components such as a radio frequency (Radio Frequency, RF) unit 110, a memory 120, another input device 130, a screen 140, a sensor 150, an audio circuit 160, an I/O subsystem 170, a processor 180, and a power supply 190. A person skilled in the art may understand that the structure of the mobile phone shown in FIG. 2 does not constitute a limitation on the mobile phone, and may include more or fewer components than those shown in the figure, or combine some components, or split some components, or have different component arrangements.

To facilitate understanding of an overall structure of the mobile terminal, the following specifically describes the components of the mobile terminal 100 with reference to FIG. 2.

The RF circuit 110 may be configured to receive and send signals in a process of receiving and sending information or a call process. Specifically, after receiving downlink information of a base station, the RF circuit 110 sends the downlink information to the processor 180 for processing. In addition, the RF circuit 110 sends uplink data to the base station. Usually, the RF unit 110 is connected to an antenna 200, to communicate with a network and another device by using the antenna 200. The RF unit 110 includes but is not limited to at least one amplifier, transceiver, coupler, low noise amplifier (Low Noise Amplifier, LNA), duplexer, or the like.

The memory 120 may be configured to store a software program and a module, and the processor 180 runs the software program and the module that are stored in the memory 120, to perform various function applications and data processing of the mobile terminal 100. The memory 120 may mainly include a program storage region and a data storage region. The program storage region may store an operating system, an application required by at least one function (such as a sound play function and an image display function), and the like. The data storage region may store data (such as audio data and an address book) created according to use of the mobile terminal 100, and the like. In addition, the memory 120 may include a high-speed random access memory, and may further include a non-volatile memory, for example, at least one magnetic disk storage device, a flash storage device, or another volatile solid-state storage device.

To enable the mobile terminal to perform interactive operations such as display and input, the mobile terminal includes the another input device 130, the screen 140, the sensor 150, the audio circuit 160, and the like. The another input device 130 may be configured to: receive input digit or character information, and generate key signal input related to user setting and function control of the mobile terminal 100. The another input device 130 is connected to another input device controller 171 in the I/O subsystem 170, and exchanges a signal with the processor 180 under the control of the another input device controller 171. The screen 140 may be configured to display information that is input by a user or information provided for a user, and various menus of the mobile terminal 100, and may further receive user input. Specifically, the screen 140 may include a display panel 141, a touch panel 142, and the like. In addition, the sensor 150 included in the mobile terminal 100 may identify and perceive ambient environment parameter information of the mobile phone. Specifically, the sensor 150 may include a light sensor, a motion sensor, a gyroscope, a barometer, a hygrometer, a thermometer, an infrared sensor, or the like.

The I/O subsystem 170 is configured to control an external input/output device, and a display controller 173 in the I/O subsystem 170 receives a signal from the screen 140 and/or sends a signal to the screen 140. After the screen 140 detects user input, the display controller 173 converts the detected user input into interaction with a user interface object displayed on the screen 140, to implement man-machine interaction. The sensor controller 172 may receive a signal from one or more sensors 150 and/or send a signal to one or more sensors 150.

The processor 180 is a control center of the mobile terminal 100, and is connected to various parts of the entire mobile phone by using various interfaces and lines. By running or executing the software program and/or module stored in the memory 120, and invoking data stored in the memory 120, the processor 180 performs various functions and data processing of the mobile terminal 100, thereby performing overall monitoring on the mobile phone. Optionally, the processor 180 may include one or more processing units.

In addition, the mobile terminal 100 further includes the power supply 190 that supplies power to the components, and another component or structure. Details are not described herein.

Figure 4:
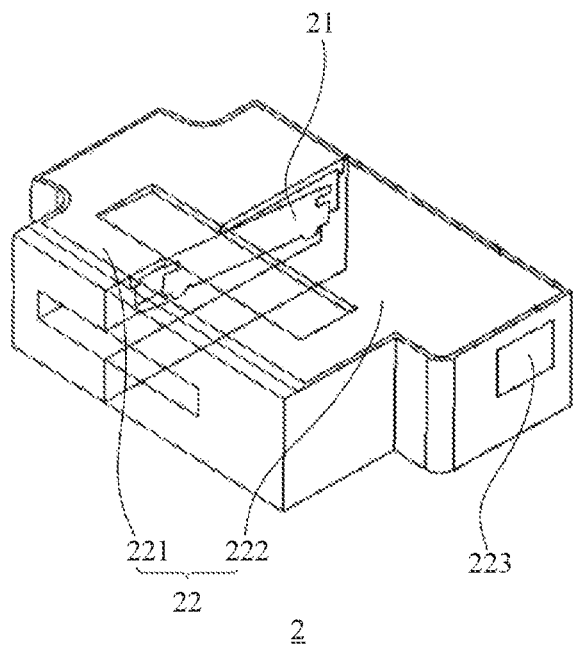
FIG. 4 is a schematic diagram of a structure of a speaker component in a mobile terminal according to an embodiment of this application.
Figure 5:
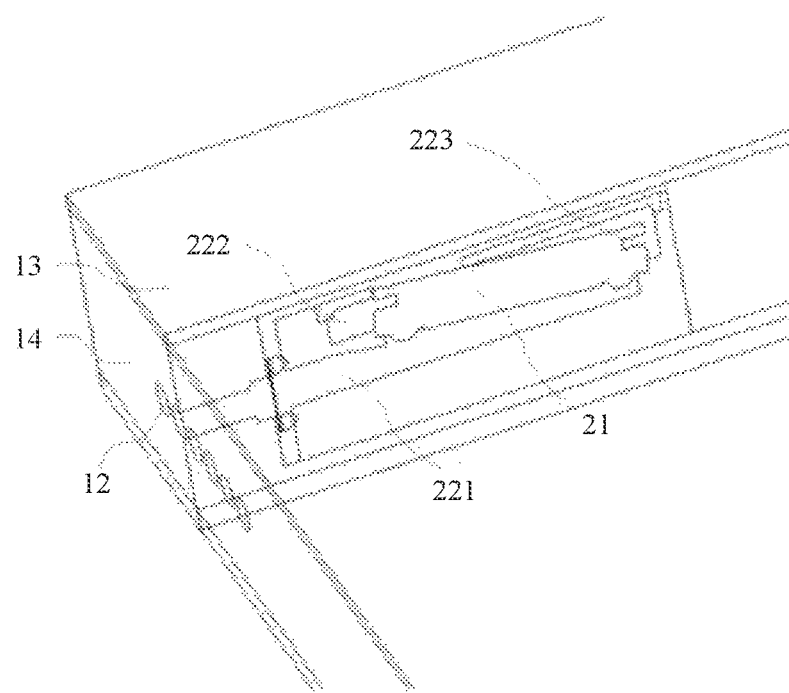
FIG. 5 is a schematic diagram of a position of a speaker component in a housing in a mobile terminal according to an embodiment of this application.

To implement a sound play function of the mobile terminal, the mobile terminal includes the speaker component 2. FIG. 4 is a schematic diagram of a structure of the speaker component in the mobile terminal according to an embodiment of this application. FIG. 5 is a schematic diagram of a position of the speaker component in the housing in the mobile terminal according to an embodiment of this application. As shown in FIG. 1 to FIG. 5, the housing 1 of the mobile terminal has an inner cavity 11, and the inner cavity is mainly configured to dispose various functional components inside the mobile terminal. The speaker component 2 is disposed in the inner cavity 11 of the housing 1 of the mobile terminal, and plays a sound by using a sound output hole 12 on the housing 1. Specifically, the speaker component 2 includes a speaker unit 21, and the speaker unit 21 may mainly include different components such as a voice coil, a diaphragm, and a magnetic circuit component. An electrical signal may be input to the voice coil by using the audio circuit 160, and an electromagnetic field is correspondingly generated. In this way, under the joint action of a magnetic field of the voice coil and a magnetic field generated by the magnetic circuit component, the voice coil can drive the diaphragm to reciprocate, to vibrate and sound. To enable the speaker component 2 to have a relatively good acoustic characteristic, the speaker component 2 further includes an accommodating cavity 22 that can accommodate the speaker unit 21. The speaker unit 21 divides the accommodating cavity 22 into a front speaker box 221 and a rear speaker box 222. The front speaker box 221 is located on a sound output side of the speaker unit 21, and mainly affects a high-frequency sound output part of the speaker unit 21. The rear speaker box 222 is located on a side that is of the speaker unit 21 and that is opposite to the sound output side, and mainly affects a low-frequency sound output part of the speaker unit 21.

Figure 6:
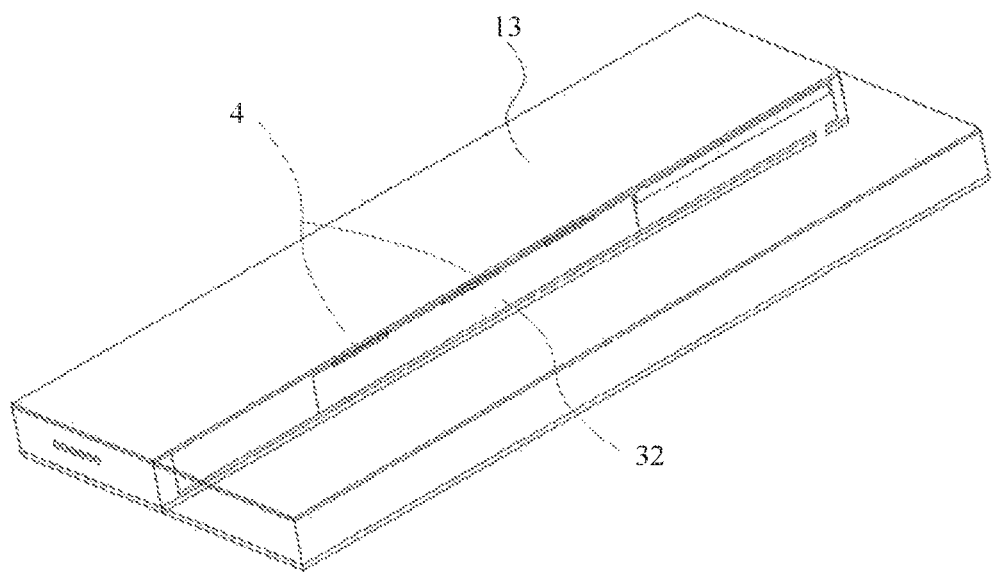
FIG. 6 is a schematic diagram of an inner cross-section of a mobile terminal according to an embodiment of this application.

In this embodiment, to improve acoustic indicators such as a volume and loudness of the speaker component 2, the speaker component 2 has an open or semi-open rear speaker box 222. Specifically, an air vent 223 is disposed on a wall of the rear speaker box 222, and the air vent is connected to the inner cavity 11 of the housing 1. In this way, when the speaker component 2 sounds, an airflow generated due to vibration of an element such as the diaphragm enters the inner cavity 11 of the housing 1 through the air vent, or enters the rear speaker box 222 from the inner cavity 11 of the housing 1. In this way, air pressure in the rear speaker box 222 is balanced, thereby preventing a pressure change in the rear speaker box 222 from affecting normal sounding of the speaker component 2. However, after flowing to the inner cavity 11 of the housing 1, the airflow impacts on a structure of the housing 1. The structure of the housing 1 of the mobile terminal is relatively thin, and a relatively low inherent frequency of the housing 1 is relatively close to a vibration impact frequency of the airflow. In this case, under the vibration impact of the airflow, the housing 1 is prone to vibrate at a relatively large amplitude. Therefore, a flexible sound absorbing member is further disposed on an inner wall of the housing 1, to buffer the airflow and damp vibration of the housing 1 that is caused by the airflow. FIG. 6 is a schematic diagram of an inner cross-section of the mobile terminal according to an embodiment of this application. As shown in FIG. 2 and FIG. 6, a flexible sound absorbing member 4 is disposed in the housing 1, so that an airflow generated by the speaker component 2 can be buffered.

Specifically, the flexible sound absorbing member 4 is made of a flexible material, and occupies at least a part of space of the inner cavity 11 of the housing 1. Because the flexible sound absorbing member 4 is located in the inner cavity 11 of the housing 1, a part of the space of the inner cavity 11 of the housing 1 is filled, so that the inner cavity 11 of the housing 1 is equivalent to a "solid" structure. In this case, the space of the inner cavity 11 of the housing 1 is substantially compressed. When flowing in the inner cavity 11 that is of the housing 1 and in which the flexible sound absorbing member 4 is disposed, an airflow continuously collides with a surface or an inner structure of the flexible sound absorbing member 4 and is impeded by the flexible sound absorbing member 4. In this way, energy of the airflow is attenuated under an impedance action of the flexible sound absorbing member 4. In addition, the flexible sound absorbing member 4 is made of the flexible material.

Therefore, when the airflow encounters the surface of the flexible sound absorbing member 4, impact energy of the airflow may also be attenuated through deformation buffering of the flexible sound absorbing member 4. In this way, the flexible sound absorbing member 4 can impede movement of the airflow, so that the energy of the airflow can be attenuated.

In addition, when the flexible sound absorbing member 4 is disposed in the inner cavity 11 of the housing 1, the flexible sound absorbing member 4 may be in contact with at least a part of a wall of the inner cavity 11. Because the flexible sound absorbing member 4 has specific elasticity, the flexible sound absorbing member 4 may be supported on the wall by using an elastic force of the flexible sound absorbing member 4, so that walls on two sides of the inner cavity 11 of the housing 1 are supported by the flexible sound absorbing member 4. In this way, under the support of the flexible sound absorbing member 4, an inherent frequency of the entire housing 1 is improved, so that the inherent frequency falls outside a vibration frequency range of an airflow generated in the speaker component 2 during vibration, thereby damping vibration of the housing 1.

The flexible sound absorbing member 4 may be of a plurality of different shapes and structures, such as a sheet shape and a plate shape. In addition, with different overall structures and inner layouts of the mobile terminal, the flexible sound absorbing member 4 may be disposed in the inner cavity 11 of the housing 1 in a plurality of different manners. The following separately provides specific descriptions.

In an optional implementation, the mobile terminal further includes a bracket component 3 located inside the housing 1. The bracket component 3 includes a bracket 31 and a circuit element disposed on the bracket 31, the speaker component 2 is disposed on the bracket component 3, and the flexible sound absorbing member 4 is disposed between the bracket component 3 and the inner wall of the housing 1. This is specifically shown in FIG. 2.

Specifically, the bracket component 3 of the mobile terminal may serve as a main body in the mobile terminal, and includes a support component or a support structure, such as the bracket 31. The bracket 31 may serve as a bearer of another component, and is connected to the housing 1 of the mobile terminal. Circuit elements such as a main circuit board and a battery 32 in the mobile terminal may be disposed on the bracket 31, and fastened by the bracket 31.

In this case, the speaker component 2 may also be located on the bracket component 3, and is directly or indirectly connected to the bracket 31 in the bracket component 3. Because the front speaker box 221 in the speaker component 2 needs to be connected to the sound output hole 12 of the housing 1, and complete a sound output function during media playback or a voice call, the speaker component 2 may be located on a side that is of the bracket component and that is close to the housing 1, and specifically, may be located in an upper part or a lower part of the mobile terminal. In this embodiment, an example in which the speaker component 2 is located in the lower part of the mobile terminal is used for description. When the speaker is located in the lower part of the mobile terminal, the sound output hole 11 of the housing 1 may be located in a bottom part of the housing 1 or a lower region on a side of the housing 1.

Because the bracket component 3 serves as the main body and a main support structure in the mobile terminal, the bracket component 3 may occupy entire length and width directions of the mobile terminal. In this way, the cavity inside the housing 1 mainly occupies a space region between the bracket component 3 and the inner wall of the housing 1. When the speaker component 2 causes airflow impact due to sounding, the inner wall of the housing 1 is also impacted on in the space region, and consequently the inner wall of the housing 1 vibrates. The flexible sound absorbing member 4 for sound absorbing and vibration damping is disposed in the space region, that is, is located between the bracket component 3 and the inner wall of the housing 1, so that impact and vibration caused by an airflow in the space region can be damped, thereby damping vibration of the housing 1 in the sound output airflow of the speaker component 2.

To reduce a thickness of the mobile terminal, the space region formed between the bracket component 3 and the inner wall of the housing 1 also has a relatively small thickness, and a size in this direction is significantly smaller than a size of the mobile terminal in other directions (the length and width directions). To be disposed in the space region with the relatively small thickness, the flexible sound absorbing member 4 also has a relatively small thickness in this direction.

Specifically, a gap with relatively uniform thicknesses may be formed between the bracket component 3 and the inner wall of the housing 1. In this way, the entire flexible sound absorbing member 4 may be of a thin sheet-shaped or thin plate-shaped structure. The thin sheet-shaped or thin plate-shaped flexible sound absorbing member 4 can adapt to a relatively small gap thickness between the bracket component 3 and the inner wall of the housing 1. In addition, the flexible sound absorbing member 4 may have relatively large sizes and areas in the directions different from the thickness direction. In this way, the flexible sound absorbing member 4 can have a relatively good buffering capability due to the relatively large areas and sizes of the flexible sound absorbing member 4.

The flexible sound absorbing member 4 may occupy at least the part of the space of the inner cavity 11 of the housing 1. For example, because the mobile terminal internally has the bracket component 3, the flexible sound absorbing member 4 may occupy a part or all of the space region between the bracket component 3 and the inner wall of the housing 1.

Optionally, the flexible sound absorbing member 4 may have space and a size that match a shape and a size of the region space. When the housing 1 of the mobile terminal is approximately square, correspondingly, the space region formed between the bracket component 3 and the inner wall of the housing 1 is approximately cuboid. To be disposed in the space region, the entire flexible sound absorbing member 4 may also be square.

Figure 7:
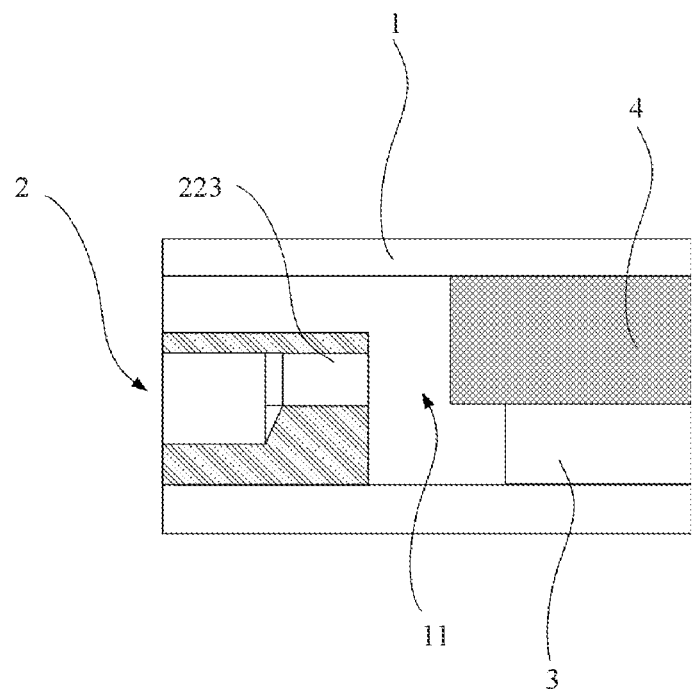
FIG. 7 is a schematic diagram of a disposition structure of a flexible sound absorbing member in a housing according to an embodiment of this application.

FIG. 7 is a schematic diagram of a disposition structure of the flexible sound absorbing member in the housing according to an embodiment of this application. As shown in FIG. 7, when the flexible sound absorbing member 4 is located between the bracket component 3 and the inner wall of the housing 1, in an optional implementation, two opposite sides of the flexible sound absorbing member 4 may respectively abut against the bracket component 3 and the inner wall of the housing 1.

Specifically, because the flexible sound absorbing member 4 may be elastically deformed to a specific degree, the flexible sound absorbing member 4 may have a size greater than or equal to a size of a space region in which the flexible sound absorbing member 4 is located. In this way, the flexible sound absorbing member 4 can abut against the inner wall of the housing 1, to be supported on the inner wall of the housing 1. After the wall of the inner cavity 11 of the housing 1 is supported by the flexible sound absorbing member 4, it is equivalently that a support point is added to the original cavity of the housing 1. In this case, if the housing 1 has a vibration tendency, when the housing 1 vibrates, the housing 1 moves in a direction in which the housing 1 compresses the flexible sound absorbing member 4 or the housing 1 gets far away from the flexible sound absorbing member 4, an acting force of the housing 1 is also transmitted to the bracket component 3 by using the flexible sound absorbing member 4, and the housing 1 is affected by a reverse support force of the bracket component 3, to change the original vibration tendency of the housing 1. Therefore, an inherent vibration frequency of the entire housing 1 changes. When an airflow of the speaker component 2 passes through the inner cavity 11 of the housing 1, an inherent frequency of the housing 1 falls outside a vibration frequency range of the airflow, so that an amplitude of the housing 1 decreases, thereby damping vibration of the entire mobile terminal.

In this embodiment, because the flexible sound absorbing member 4 is sandwiched between the bracket component 3 and the inner wall of the housing 1, a size of the flexible sound absorbing member 4 in a thickness direction of the housing 1 may be set to be greater than or equal to a size of the space formed between the bracket component 3 and the inner wall of the housing 1 in the direction. In this way, the flexible sound absorbing member 4 located between the bracket component 3 and the inner wall of the housing 1 is in a compression deformed state, and two opposite sides (that is, a side facing the bracket component 3 and a side facing the inner wall of the housing 1) of the flexible sound absorbing member 4 in the thickness direction of the housing 1 may respectively abut against the bracket component 3 and the inner wall of the housing 1, and the flexible sound absorbing member 4 supports the inner wall of the housing 1. It can be learned from the foregoing that the flexible sound absorbing member 4 may be of a thin sheet-shaped or thin plate-shaped structure. Therefore, support points can be formed between the flexible sound absorbing member 4 and a plurality of parts of the inner wall of the housing 1, to effectively support the inner wall of the housing 1.

Specifically, an inner cavity 11 with a specific thickness may be formed in the housing 1 in the mobile terminal. For example, the thickness of the inner cavity 11 may fall between 0.2 mm and 0.3 mm. A thickness of the flexible sound absorbing member 4 may be greater than the thickness of the inner cavity 11, so that when being disposed in the inner cavity 11 of the housing 1, the flexible sound absorbing member 4 is in a compressed state, and reliably abuts against the inner wall of the housing 1 to form a support.

To enable the flexible sound absorbing member 4 to have a relatively good sound absorbing and buffering effect, the flexible sound absorbing member 4 correspondingly has a structure conducive to absorbing sound and vibration, or is made of a material with relatively good absorbency. For example, as an optional structure of the flexible sound absorbing member, the flexible sound absorbing member 4 may have a porous structure.

In this case, the flexible sound absorbing member 4 is loosely textured, and internally has a porous structure with a relatively large quantity of holes. These holes are connected to the outside of the flexible sound absorbing member 4. When the speaker component 2 sounds and vibrates, an impact airflow thereby generated enters the inner cavity 11 of the housing 1 from the air vent 223, and the flexible sound absorbing member 4 located in the inner cavity 11 can enable, by using the porous structure of the flexible sound absorbing member 4, the impact airflow to enter the inner holes and collide with and rub against walls of the holes, so that kinetic energy of the airflow is converted into thermal energy through rubbing between the airflow and the flexible sound absorbing member 4, thereby attenuating energy of the impact airflow. Therefore, the flexible sound absorbing member 4 can further damp impact of the airflow on the housing 1, thereby damping vibration of the housing 1.

Optionally, the flexible sound absorbing member 4 may be specifically sound absorbing cotton. The sound absorbing cotton may also be referred to as sound absorbing foam or a sound absorbing sponge. The sound absorbing cotton is mainly made of an artificial fiber material, and may be specifically made by foaming a material, such as polyurethane (poly urethane, PU), polyethylene (polyethylene, PE), ethylene propylene diene monomer (Ethylene Propylene Diene Monomer, EPDM), or nitrile butadiene rubber (nitrile butadiene rubber, NBR), at a high temperature. There are a relatively large quantity of gaps and micro voids inside the sound absorbing foam. These micro voids are connected to each other from the surface to the inside, so that the flexible sound absorbing member 4 is relatively loosely textured as a whole and has relatively good air permeability. When an external sound wave enters the micro voids of the flexible sound absorbing member 4, air in the micro voids vibrates. Under the action of friction impedance, air sticking impedance, heat conduction, and the like, a part of sound energy and airflow kinetic energy are converted into thermal energy, to achieve a sound absorbing function.

Therefore, when the sound absorbing cotton is used as the flexible sound absorbing member 4, because the sound absorbing cotton has a relatively good damping capability for external impact and vibration, an airflow generated because the speaker component 2 sounds can be relatively well buffered and attenuated, thereby improving an anti-vibration capability of the mobile terminal. In addition, due to a loose porous structure of the sound absorbing foam, when a thickness is increased, a rebound force of the sound absorbing foam is still relatively small. Therefore, the sound absorbing foam has relatively strong height tolerance, so that structural connection between parts of the housing 1 is not adversely affected.

It should be noted that the sound absorbing foam can be elastically deformed at a relatively large degree and has a relatively small rebound force. Therefore, when the thickness of the inner cavity 11 of the housing 1 in the mobile terminal falls between 0.2 mm and 0.3 mm, a normal thickness of the sound absorbing foam in a case of no compression may fall between 1 mm and 2 mm, and is usually about 1 mm. In this way, the sound absorbing foam can achieve a relatively strong filling and support function for the inner wall of the housing 1 in a compressed state.

In addition to the sound absorbing foam, another material that has a similar loose porous structure and that can be elastically deformed at a relatively large degree, for example, a sound absorbing and buffering material familiar to a person skilled in the art, may be used to form the flexible sound absorbing member 4. This is not limited herein.

When the flexible sound absorbing member 4 is disposed in the inner cavity 11 of the housing 1, to position the flexible sound absorbing member 4, the flexible sound absorbing member 4 may be fastened in a plurality of different manners. For example, in an optional implementation, the flexible sound absorbing member 4 may be fastened in an adhesive manner. In this case, at least one of the inner wall of the housing 1 and the bracket component 3 may be adhered to the flexible sound absorbing member 4.

Specifically, the flexible sound absorbing member 4 and the inner wall of the housing 1 or the flexible sound absorbing member 4 and the bracket component 3 may be in surface contact. Therefore, the flexible sound absorbing member 4 is suitably adhered by using an adhesive. In this case, for example, the inner wall of the housing 1 may be adhered to a surface of the flexible sound absorbing member 4, a surface of the bracket component 3 may be adhered to a surface of the flexible sound absorbing member 4, or surfaces of the two opposite sides of the flexible sound absorbing member 4 are respectively adhered to the bracket component 3 and the inner wall of the housing 1. In this way, the flexible sound absorbing member 4 is fastened in the adhesive manner, without a need to dispose a fastening apparatus or a fastening structure on the housing 1 or the bracket component 3, so that an inner structure of the housing 1 is relatively simple, thereby effectively reducing structural complexity of the housing 1 and the bracket component 3, and reducing production costs.

When fastening connection of the flexible sound absorbing member 4 is implemented through adhering, a plurality of different adhesives may be selected. For example, the flexible sound absorbing member 4 may be adhered by using a double-sided tape; or a surface that needs to be adhered, such as the inner wall of the housing 1 or an outer wall of the bracket component 3, may be coated with a liquid adhesive, such as a water adhesive, and the liquid adhesive is cured, so that the adhered surface is firmly adhered to the flexible sound absorbing member 4. Alternatively, the flexible sound absorbing member 4 and the inner wall of the housing 1 may be separately coated with adhesives of different components, and the adhesives of the different components are made in contact and cured, to complete adhering; or another adhering manner commonly used by a person skilled in the art may be used. Details are not described herein.

When the flexible sound absorbing member 4 is disposed between the bracket component 3 and the inner wall of the housing 1 through abutting, the flexible sound absorbing member 4 is limited by the bracket component 3 and the housing 1 in the thickness direction of the mobile terminal. Therefore, the flexible sound absorbing member 4 can also be fastened by liming the flexible sound absorbing member 4 only in the other directions. In this case, a fastening structure, such as a limiting groove or a positioning protrusion, may be disposed at a corresponding position on the housing 1 or the bracket component 3. In an example in which the flexible sound absorbing member 4 is limited by using the inner wall of the housing 1, a positioning groove that protrudes toward the inside of the housing 1 may be formed on the inner wall of the housing 1, and a shape enclosed by the positioning groove matches an edge shape of the flexible sound absorbing member 4. In this way, the flexible sound absorbing member 4 can be clamped in the positioning groove, and a position of the flexible sound absorbing member 4 relative to the housing 1 is also limited by the positioning groove, thereby implementing limiting fastening of the flexible sound absorbing member 4.

In addition, a structure that can be fastened to the bracket component 3 or the inner wall of the housing 1 may be alternatively disposed on the flexible sound absorbing member 4. For example, an edge shape of the flexible sound absorbing member 4 may be enabled to match a corresponding position on the bracket component 3, so that an edge of the flexible sound absorbing member 4 abuts against the corresponding part on the bracket component 3, to complete fastening. Alternatively, a positioning hole may be disposed in the flexible sound absorbing member 4, a positioning protrusion may be disposed on the bracket component 3 or the inner wall of the housing 1, and the positioning protrusion is penetrated through the positioning hole to fasten the flexible sound absorbing member 4. In addition, the flexible sound absorbing member 4 may be disposed and positioned inside the housing 1 in other various detachable or non-detachable manners. This is not limited herein.

It may be understood that, because the flexible sound absorbing member 4 may serve as a support structure of the inner wall of the housing 1, parameters such as hardness of the flexible sound absorbing member 4 may affect a sound absorbing and buffering effect of the flexible sound absorbing member 4. Specifically, when the hardness of the flexible sound absorbing member 4 is relatively large, a vibration damping effect of the flexible sound absorbing member 4 for the housing 1 is relatively obvious. Therefore, sound absorbing and vibration damping performance of the flexible sound absorbing member 4 may be adjusted by replacing the flexible sound absorbing member 4 with a flexible sound absorbing member 4 with different hardness, or changing fastening and constraining manners of the flexible sound absorbing member 4.

When the flexible sound absorbing member 4 is disposed inside the housing 1, there may be a plurality of different disposition positions and manners. To enable the flexible sound absorbing member 4 to have a relatively good sound absorbing and buffering effect, there may be a plurality of different relative positions between the flexible sound absorbing member 4 and the air vent 223 of the speaker component 2. The following provides specific descriptions.

In an optional arrangement structure, the flexible sound absorbing member 4 is disposed adjacent to the air vent 223, as shown in FIG. 7. Specifically, the air vent 223 of the speaker component 2 may be opened toward the inside of the housing 1. In this case, an orientation of the air vent 223 may be a plane direction of the mobile terminal, for example, a direction perpendicular to the thickness of the mobile terminal. To enable the flexible sound absorbing member 4 to buffer an airflow flowing in/out from the air vent 223, the flexible sound absorbing member 4 may be disposed adjacent to the air vent 223, that is, the flexible sound absorbing member 4 is relatively close to the air vent 223. In this way, after flowing out from the air vent 223, an airflow can be buffered by the flexible sound absorbing member 4, thereby reducing a speed and impact of the airflow.

In this case, there may also be a plurality of different specific relative positions between the flexible sound absorbing member 4 and the air vent 223. Optionally, the flexible sound absorbing member 4 and the speaker component 2 may be located in different regions of the mobile terminal. For example, the speaker component 2 may be located in a bottom region of the mobile terminal, and the flexible sound absorbing member 4 is located in a middle region of the mobile terminal. In this case, the air vent 223 of the speaker component 2 is opened toward the inside of the housing 1, and the air vent 223 is relatively close to the flexible sound absorbing member 4. Therefore, a large part of an airflow blown in or out from the air vent 223 moves to a position in which the flexible sound absorbing member 4 is located, and is in contact and collide with the surface or the inside of the flexible sound absorbing member 4, thereby reducing a flowing speed of the airflow, and attenuating energy of the airflow. Impact of the airflow on the inner wall of the housing 1 is reduced after buffering, so that the housing 1 vibrates at a relatively small amplitude.

In an optional disposition manner, the air vent 223 of the speaker component 2 may be enabled to directly face the flexible sound absorbing member 4. In this way, there is no other structure between the flexible sound absorbing member 4 and the air vent 223 for impeding. Therefore, an airflow flowing in/out from the air vent 223 can be relatively smoothly blown to the flexible sound absorbing member 4, and impeded and buffered by the flexible sound absorbing member 4. Specifically, when the air vent 223 faces the flexible sound absorbing member 4, the air vent 223 correspondingly faces different parts of the flexible sound absorbing member 4 based on different relative positions between the speaker component 2 and the flexible sound absorbing member 4.

For example, as shown in FIG. 7, in an optional manner, the air vent 223 may face a side edge of the flexible sound absorbing member 4. In this way, an airflow blown out from the air vent 223 may be blown to the edge of the flexible sound absorbing member 4, enter the flexible sound absorbing member 4 from a side of the flexible sound absorbing member 4, and rub against and collide with the inner structure of the flexible sound absorbing member 4, so that energy is attenuated, thereby damping impact and vibration of the airflow on the housing 1. In this case, an orientation of the air vent 223 relative to the housing 1 may be a plane direction in which the housing 1 is located, that is, the direction perpendicular to the thickness of the mobile terminal.

It should be noted that, in this case, the flexible sound absorbing member 4 may internally have a hole or another structure that can be used for airflow buffering. After entering the flexible sound absorbing member 4 from the side of the flexible sound absorbing member 4, an airflow may flow in a length or width direction of the flexible sound absorbing member 4. In this way, a flowing path of the airflow inside the flexible sound absorbing member 4 is relatively long, and the flexible sound absorbing member 4 can attenuate energy of the airflow to a relatively large degree.

Figure 8:
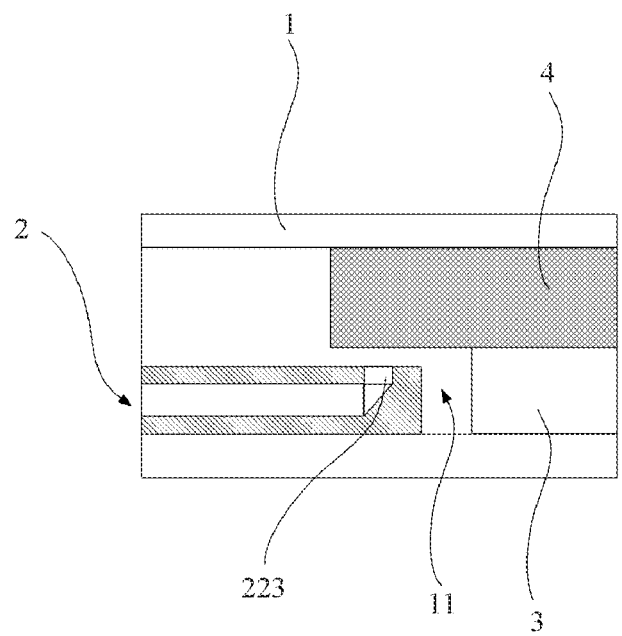
FIG. 8 is a schematic diagram of another disposition structure of a flexible sound absorbing member in a housing according to an embodiment of this application.

FIG. 8 is a schematic diagram of another disposition structure of the flexible sound absorbing member in the housing according to an embodiment of this application. As shown in FIG. 8, in another optional manner, the air vent 223 of the speaker component 2 may be enabled to directly face a front surface of the flexible sound absorbing member 4. In this case, the air vent 223 of the speaker component 2 does not face a side edge of the flexible sound absorbing member 4, but faces the front surface of the flexible sound absorbing member 4. In this case, an orientation of the air vent 223 may be a thickness direction of the mobile terminal, and a position of the flexible sound absorbing member 4 may at least partially overlap a position of the air vent 223 inside the mobile terminal. Because the front surface of the flexible sound absorbing member 4 has a relatively large area enough to cover the air vent 223 of the speaker, an airflow flowing in/out from the air vent 223 is directly blown to the front surface of the flexible sound absorbing member 4, collides with the front surface of the flexible sound absorbing member 4, and is impeded and buffered by the flexible sound absorbing member 4. Because the air vent 223 directly faces the front surface of the flexible sound absorbing member 4, the flexible sound absorbing member 4 can buffer an airflow when the airflow is just blown out of the air vent 223, thereby directly impeding the airflow.

In addition, with different orientations of the air vent 223 in the speaker component 2 and different disposition manners of the flexible sound absorbing member 4, there may be other different disposition manners and relative positions between the air vent 223 and the flexible sound absorbing member 4. No limitation is imposed herein.

In the mobile terminal, the housing 1 is usually not an integral structure, but is divided into different components. For example, the housing 1 may include structures such as a rear cover 13 and a middle frame 14. The middle frame 14 is located on the side of the mobile terminal, the rear cover 13 is located on a side that is of the mobile terminal and that is opposite to the screen 140, and the middle frame 14, the screen 140, and the rear cover 13 jointly form a closed structure of the mobile terminal through enclosing. In the components of the housing 1, the rear cover 13 in the housing 1 has a relatively large coverage area (a back side region of the entire mobile terminal). In addition, due to a limitation of an overall thickness of the mobile terminal, the rear cover 13 also needs to have a relatively small thickness. Therefore, when an airflow in the inner cavity 11 of the housing 1 impacts on the rear cover 13 when the speaker component 2 sounds, the rear cover 13 is deformed to a relatively large degree, causing relatively severe vibration. In this case, the rear cover 13 forms a main resonance component in the housing 1. Therefore, the flexible sound absorbing member 4 may be disposed corresponding to the rear cover 13, to damp vibration of the rear cover 13. In an optional implementation, when the housing 1 includes the rear cover 13, the flexible sound absorbing member 4 may be attached to an inner wall of the rear cover 13, to reduce an influence of an impact airflow inside the housing 1 on the rear cover 13.

Specifically, the rear cover 13 of the housing 1 covers most regions on a back side of the mobile terminal, and the inner wall of the rear cover 13 forms a relatively flat surface region with a relatively large area. In this way, the rear cover 13 and different structures such as the bracket component 3 jointly form the inner cavity 11 of the housing 1 through enclosing. When the speaker component 2 sounds, an airflow of the air vent 223 can enter the inner cavity 11, and drive the rear cover 13 with a relatively small thickness to vibrate. To suppress vibration of the rear cover 13, the flexible sound absorbing member 4 may be attached to the inner wall of the rear cover 13, and covers a part of the rear cover 13 or even the entire rear cover 13. In this way, an airflow blown out of the air vent 223 first flows to the surface of the flexible sound absorbing member 4, and is buffered by the flexible sound absorbing member 4. The flexible sound absorbing member 4 is in contact with the rear cover 13, and therefore a formed structure has a relatively high inherent frequency, so that the inherent frequency can fall outside a vibration frequency range of the airflow, thereby damping vibration of the rear cover 13.

When being attached to the inner wall of the rear cover 13, the flexible sound absorbing member 4 may be directly in contact with the inner wall of the rear cover 13, or indirectly attached to the inner wall of the rear cover 13 by using another structure. The flexible sound absorbing member 4 may be adhered to the inner wall of the rear cover 13, or may be fastened relative to the rear cover 13 by using another limiting structure. No limitation is imposed herein.

Figure 9:
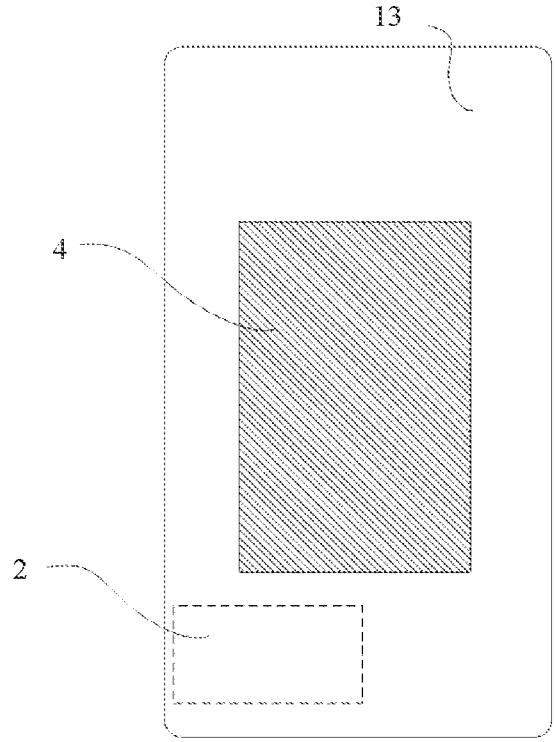
FIG. 9 is a schematic diagram of a position of a flexible sound absorbing member relative to a rear cover in a mobile terminal according to an embodiment of this application.

To improve a vibration suppression effect of the flexible sound absorbing member 4 for the rear cover 13, optionally, the flexible sound absorbing member 4 may be located in a middle region of the rear cover 13. FIG. 9 is a schematic diagram of a position of the flexible sound absorbing member relative to the rear cover in the mobile terminal according to an embodiment of this application. As shown in FIG. 9, specifically, the rear cover 13 may traverse the entire housing 1 in the length and width directions of the mobile terminal, that is, a back side of the entire housing 1 is covered by the rear cover 13. An end portion and an edge of the rear cover 13 are connected to the middle frame 14, and a central region of the rear cover 13 is suspended and forms a gap with another structure inside the housing 1, such as the bracket component 3. When an airflow from the air vent 223 impacts on the rear cover 13, because deflection of the central region of the rear cover 13 is relatively large, the rear cover 13 is deformed at a relatively large degree, causing a relatively large amplitude. Therefore, the flexible sound absorbing member 4 is disposed in the middle region of the rear cover 13. On one hand, the flexible sound absorbing member 4 directly buffers the airflow, so that energy of the airflow is attenuated, thereby reducing an impact force of the airflow on this part. On the other hand, the flexible sound absorbing member 4 disposed in the middle region of the rear cover 13 may be supported on an inner wall of the middle region of the rear cover 13, so that this part of region of the rear cover 13 is supported. In this way, a vibration tendency of the middle region of the rear cover 13 is suppressed, and an inherent frequency of the rear cover 13 is changed, so that the inherent frequency falls outside a vibration frequency range of the airflow, thereby damping vibration of the rear cover 13.

When the flexible sound absorbing member 4 is disposed on the inner wall of the rear cover 13, a surface of a side that is of the flexible sound absorbing member 4 that is opposite to the inner wall of the rear cover 13 may be in contact with different components and structures inside the housing 1. In an optional structural form, the circuit element included in the bracket component 3 includes the battery 32 configured to supply power to the mobile terminal. The battery 32 is disposed on the bracket 31, and the battery 32 faces the inner wall of the rear cover 13. In this case, the flexible sound absorbing member 4 can be disposed between the battery 32 and the inner wall of the rear cover 13.

To supply enough power to the mobile terminal, the battery 32 usually has a relatively large size and coverage area. In this way, the battery 32 occupies relatively large space in the housing 1 of the mobile terminal. To facilitate arrangement of other components and structures in the mobile terminal, the battery 32 may be disposed in the middle region of the mobile terminal. In addition, the battery 32 of the mobile terminal is usually of a relatively regular structure such as a cuboid, and a disposition direction of the battery 32 of the mobile terminal may be kept consistent with a direction of the housing 1 of the mobile terminal, that is, length and width directions of the battery 32 are the same as length and width directions of the housing 1 of the mobile terminal, and a thickness direction of the battery 32 is the same as the thickness direction of the housing 1. In this way, the battery 32 occupies relatively regular space inside the housing 1 of the mobile terminal, thereby facilitating disposition of other components in the housing 1.

It can be learned from the foregoing that the battery 32 occupies the middle region inside the housing 1 of the mobile terminal, and has a relatively large coverage area. Therefore, the flexible sound absorbing member 4 may be correspondingly disposed between the battery 32 and the inner wall of the rear cover 13. In this case, the flexible sound absorbing member 4 may be sandwiched between an outer wall of the battery 32 and the inner wall of the rear cover 13. Because the outer wall of the battery 32 has a relatively flat surface with a relatively large area, the flexible sound absorbing member 4 may correspondingly have relatively uniform and consistent thicknesses, and firmly support the inner wall of the rear cover 13.

To enable the flexible sound absorbing member 4 to have a good buffering and sound absorbing effect, the flexible sound absorbing member 4 should have a relatively large coverage area and range. When the flexible sound absorbing member 4 is disposed corresponding to the battery 32, optionally, the flexible sound absorbing member 4 may cover a surface that is of the battery 32 and that faces the inner wall of the rear cover 13.

In this case, the surface that is of the battery 32 and that faces the inner wall of the rear cover 13 may be a rectangular surface, and the surface of the battery 32 has a relatively large size and area. Therefore, the battery 32 accounts for a relatively large area proportion on the back side of the mobile terminal. Correspondingly, the flexible sound absorbing member 4 located in the inner cavity 11 of the housing 1 covers at least the rectangular surface, to form a relatively large buffering and protection region in the inner cavity 11 of the housing 1. In this way, a relatively large part of region in the inner cavity 11 of the housing 1 can be covered by the flexible sound absorbing member 4, so that the flexible sound absorbing member 4 implements a relatively good buffering and vibration damping function.

It should be noted that, because the inner cavity 11 of the housing 1 is mainly formed by structures such as the rear cover 13 and the middle frame 14 through enclosing, a maximum coverage range of the flexible sound absorbing member 4 in the inner cavity 11 of the housing 1 usually does not exceed an area and a range of the rear cover 13. That is, a size of the flexible sound absorbing member 4 is less than a size and the coverage area of the rear cover 13, and a shape of the flexible sound absorbing member 4 usually matches a shape of the rear cover 13 and is also a relatively regular shape, for example, rectangular, on the back side.

In addition, based on different structures and shapes of the inner cavity 11 of the housing 1, the flexible sound absorbing member 4 may further have other different structures and disposition manners. Details are not described herein.

Figure 10:
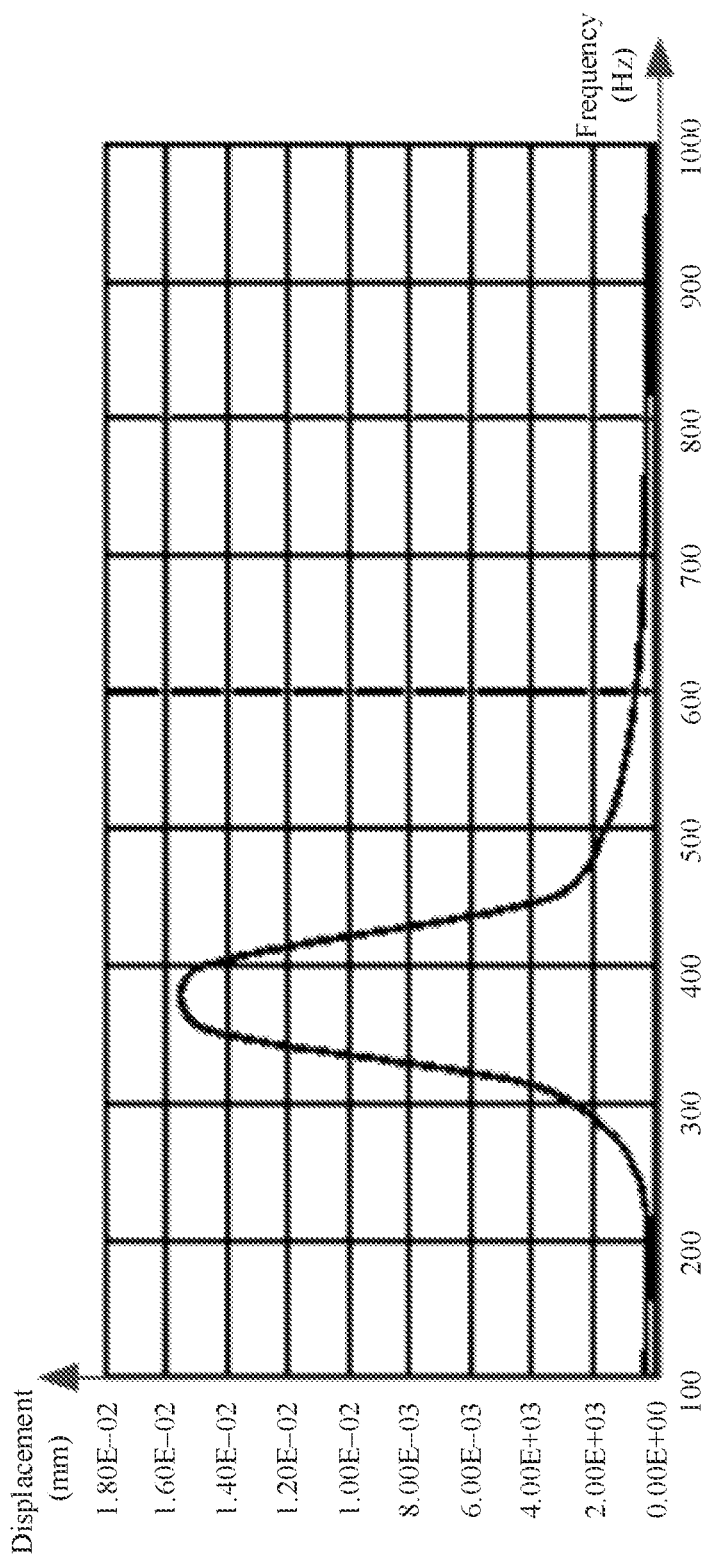
FIG. 10 is a schematic diagram of a vibration state in a case in which a flexible sound absorbing member is disposed inside a mobile terminal according to an embodiment of this application.

FIG. 10 is a schematic diagram of a vibration state in a case in which the flexible sound absorbing member is disposed inside the mobile terminal according to an embodiment of this application. FIG. 10 specifically shows an actual amplitude of the housing 1 under a buffering action of the flexible sound absorbing member 4 in a case in which sound absorbing foam is disposed inside the mobile terminal as the flexible sound absorbing member 4. Because the rear cover 13 of the housing 1 has a relatively large span, a relatively large amplitude is caused for the middle region of the rear cover 13, and the amplitude of the rear cover 13 can be reduced by disposing the flexible sound absorbing member 4 on the rear cover 13. As shown in FIG. 10, when an airflow impact frequency approaches 400 Hz, resonance is caused for the rear cover 13, and a maximum amplitude (displacement) of the rear cover 13 is approximately only 0.015 mm to 0.017 mm. In this way, an amplitude of the rear cover 13 is relatively small, so that vibration of the rear cover 13 is damped.

In this embodiment, the rear speaker box 222 in the speaker component 2 is an open or semi-open speaker box, and has the air vent 223 with a relatively large area. When the air vent 223 has different structures and cross-sectional areas, a sound output characteristic of the speaker component 2 correspondingly changes. For example, when the air vent 223 has different cross-sectional areas, the speaker component 2 may have different acoustic impedance. Therefore, the sound output characteristic of the speaker component 2 may be adjusted by disposing an adjustment structure at the air vent 223.

Figure 11:
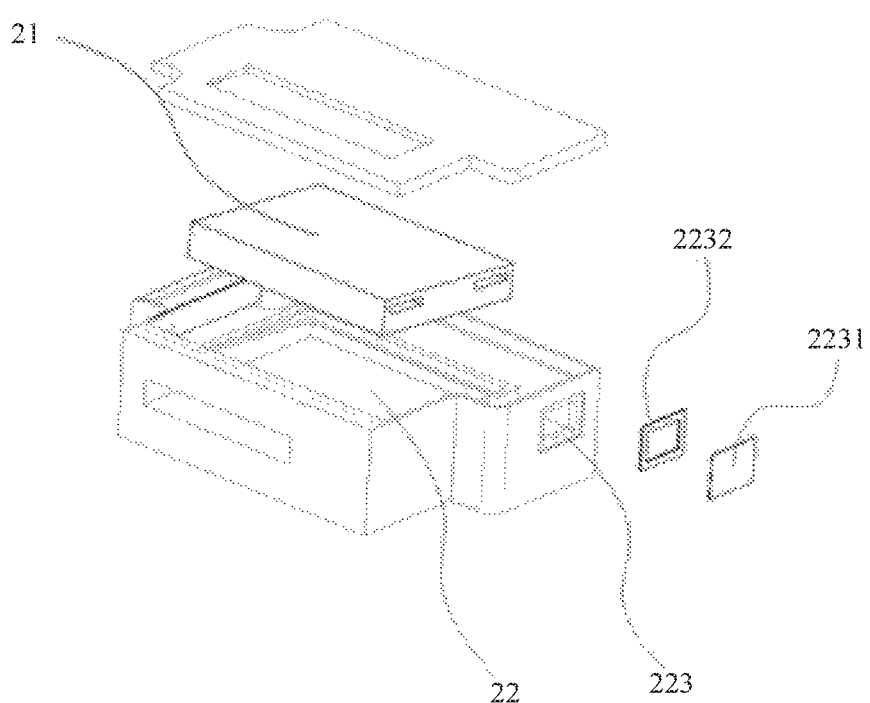
FIG. 11 is a schematic exploded diagram of a speaker component in a mobile terminal according to an embodiment of this application.

FIG. 11 is a schematic exploded diagram of the speaker component in the mobile terminal according to an embodiment of this application. As shown in FIG. 11, in this case, as an optional structure of the air vent 223, a dust filter 2231 may be disposed on the air vent 223. The dust filter 2231 has densely distributed filtering holes or meshes. Therefore, different dust filter 2231 forms may be used, for example, different mesh diameters may be set, to change a structure and a cross-sectional area of the air vent 223, and correspondingly adjust an acoustic indicator such as acoustic impedance of the speaker component 2 during sounding, thereby improving a sound output effect of the mobile terminal. In addition, the dust filter 2231 may also be configured to block impurities such as dust, so that the rear speaker box 222 of the speaker component 2 is isolated from the inner cavity 11 of the housing 1, thereby preventing the speaker box inside the speaker component 2 from being affected by dust.

The dust filter 2231 may be disposed at the air vent 223 in a plurality of manners. For example, the dust filter 2231 is connected to the speaker component 2 in a clamping manner or another detachable manner, or is directly adhered to the air vent 223 by using a back adhesive 2232. A specific disposition manner of the dust filter 2231 is not limited herein.

It should be noted that, to enable the speaker component 2 to have a relatively large volume and relatively large loudness, an area of the air vent 223 may be greater than or equal to 10 mm$^2$. In this embodiment, the cross-sectional area of the air vent 223 may be about 17 mm$^2$ to 18 mm$^2$.

When the flexible sound absorbing member 4 is used to suppress and eliminate vibration of the housing 1 due to an airflow of the speaker component 2, another support and connection structure may be alternatively used to strengthen support of the housing 1, to change a vibration frequency of the housing 1, thereby further damping vibration of the housing 1. The housing 1 may be connected to another structure of the mobile terminal by using an adhesive or another connection structure, to perform auxiliary support at an adhering position of the housing 1.

Figure 12:
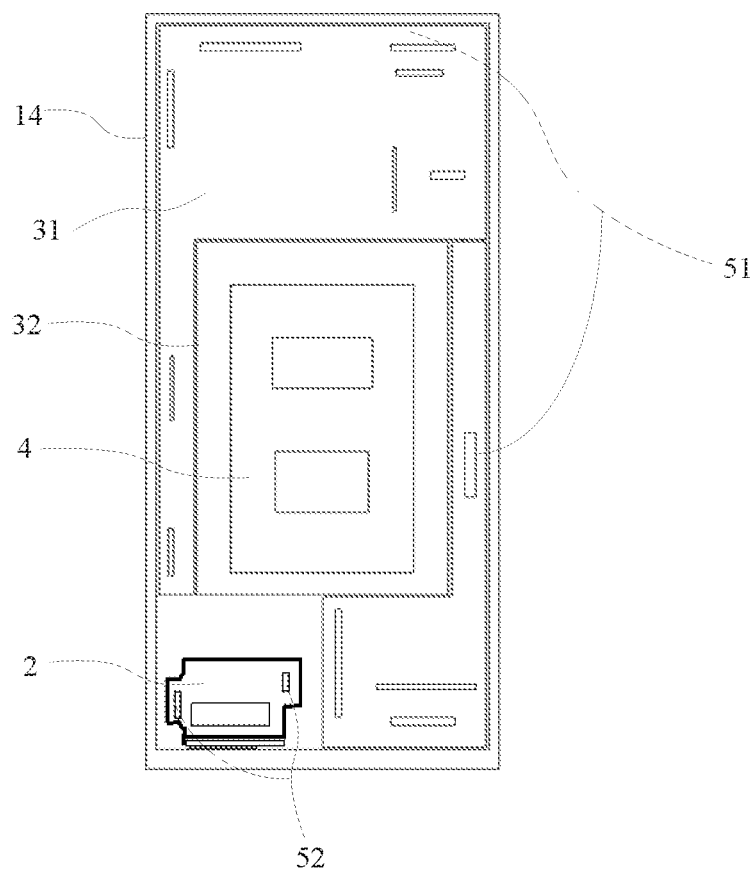
FIG. 12 is a schematic diagram of distribution of an adhesive substance in a mobile terminal according to an embodiment of this application.
Figure 13:
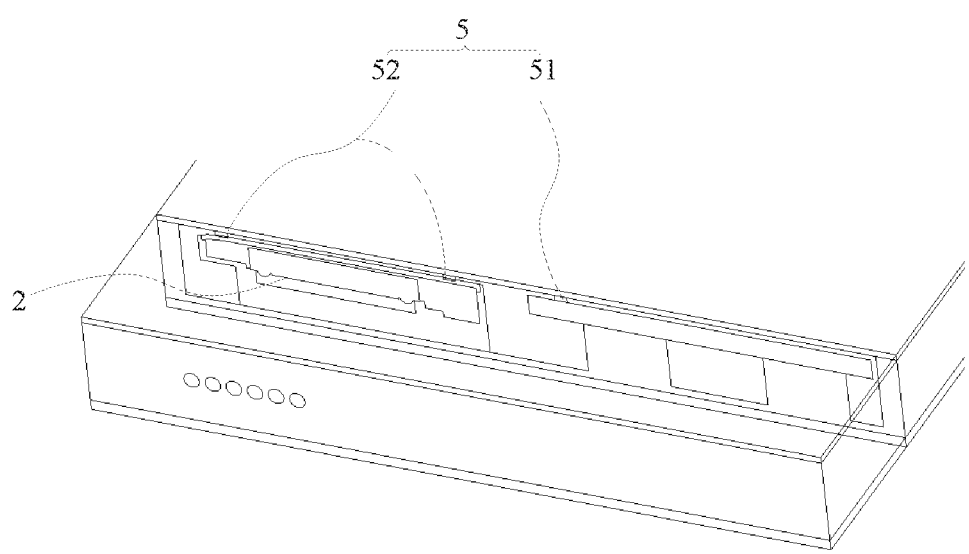
FIG. 13 is a schematic diagram of disposition of the adhesive substance in FIG. 12 in a thickness direction of a housing of a mobile terminal.

FIG. 12 is a schematic diagram of distribution of an adhesive substance in the mobile terminal according to an embodiment of this application. FIG. 13 is a schematic diagram of disposition of the adhesive substance in FIG. 12 in the thickness direction of the housing of the mobile terminal. As shown in FIG. 12 and FIG. 13, in an optional implementation, connection between the housing 1 and the bracket component 3 inside the housing 1 may be assisted by using the adhesive substance, to perform auxiliary support for the housing 1 by using the bracket component 3. Specifically, the bracket component 3 is adhered to the inner wall of the rear cover 13 by using an adhesive substance 5. The adhesive substance 5 includes at least one of a first adhesive substance 51 and a second adhesive substance 52, the first adhesive substance 51 is located in an edge region of the rear cover 13, and the second adhesive substance 52 is connected between the speaker component 2 and the rear cover 13.

When the rear cover 13 of the housing 1 is adhered, by using the adhesive substance 5, to the bracket component 3 located inside the housing 1, the adhesive substance 5 may be connected to different specific regions of the rear cover 13. As described above, the adhesive substance 5 may include the first adhesive substance 51 or the second adhesive substance 52, the first adhesive substance 51 is adhered to the edge region of the rear cover 13 and connects the edge region of the rear cover 13 and the bracket component 3, and the second adhesive substance 52 connects the speaker component 2 and the rear cover 13 together. In this way, connection between the rear cover 13 and another component can be enhanced by using the adhesive substance, to help improve rigidity and support strength of the entire rear cover 13, and change a vibration frequency of the housing 1, so that the vibration frequency falls outside a sound wave and airflow frequency range of the speaker component 2, thereby damping vibration of the housing.

To fasten and connect different parts of the rear cover 13, the adhesive substance 5 includes the first adhesive substance 51 and the second adhesive substance 52 that are separately adhered to different regions of the rear cover 13. The following separately describes specific disposition positions of the first adhesive substance 51 and the second adhesive substance 52 in detail.

Specifically, the first adhesive substance 51 located in the edge region of the rear cover 13 may be connected to the edge region of the rear cover 13, to avoid vibration of the edge region of the rear cover 13 under airflow impact. The flexible sound absorbing member 4 may be located in the middle region of the rear cover 13. Therefore, the first adhesive substance 51 may cooperate with the flexible sound absorbing member 4, and separately form support points at different parts (the middle and the edge) of the rear cover 13, to support and fasten different regions and parts of the rear cover 13. In this way, the first adhesive substance 51 and the flexible sound absorbing member 4 are used in combination, to provide relatively comprehensive support for the rear cover 13, so that overall vibration of the rear cover 13 can be effectively damped.

Figure 14:
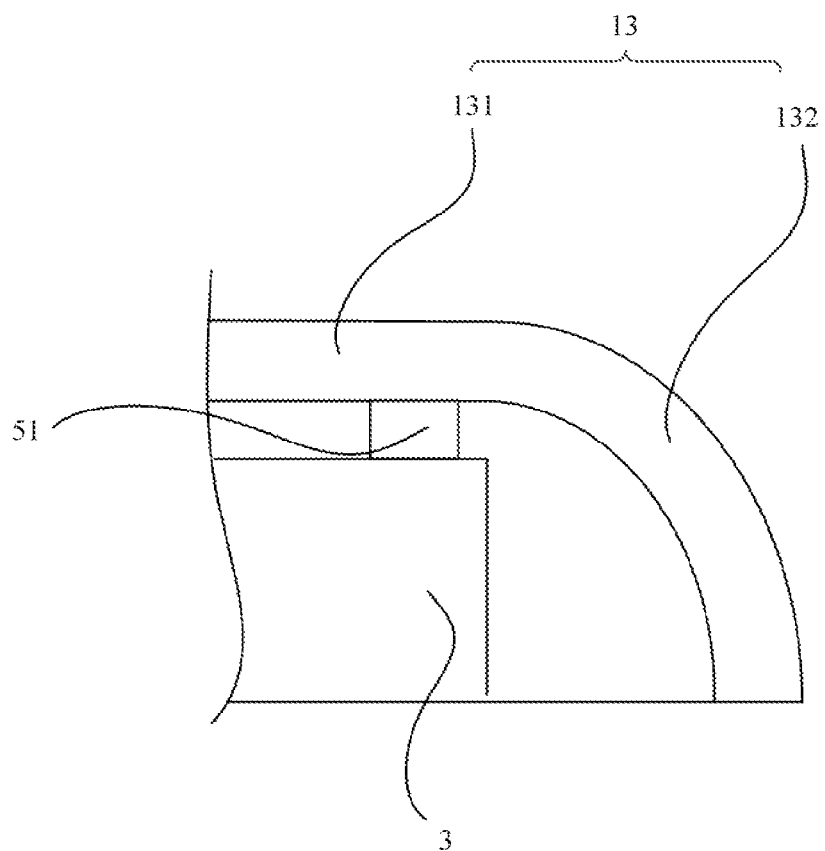
FIG. 14 is a schematic diagram of a partial structure of an edge region of a rear cover of a mobile terminal according to an embodiment of this application.

FIG. 14 is a schematic diagram of a partial structure of the edge region of the rear cover of a mobile terminal according to an embodiment of this application. As shown in FIG. 14, in an optional manner, when the rear cover 13 includes a plane region 131 and an arc surface region 132 surrounding a peripheral edge of the plane region 131, the first adhesive substance 51 may be disposed in the plane region 131, and a boundary line between the plane region 131 and the arc surface region 132 is adjacent to the first adhesive substance 51. In this case, the plane region 131 of the rear cover 13 is conveniently fastened to the first adhesive substance 51 through adhering, and an adhering position of the first adhesive substance 51 is located on an outermost side of the plane region 131 of the rear cover 13. Therefore, the first adhesive substance 51 has a relatively good support effect for the rear cover 13.

The first adhesive substance 51 may have several different shapes and disposition manners. For example, in a first disposition manner, the first adhesive substance 51 is disposed around a circumferential direction of the rear cover 13, to surround the circumference of the rear cover 13. In this case, the circumferential direction of the entire rear cover 13 is supported by the first adhesive substance 51, so that a relatively good anti-vibration effect can be achieved. A notch may be disposed in the first adhesive substance 51, to dodge an interface that is in the mobile terminal and that is configured to be connected to the outside of the housing 1.

In a second disposition manner, thereby may be a plurality of first adhesive substances 51, and the plurality of first adhesive substances 51 are separately distributed in different directions in a circumferential direction of the rear cover 13. In this way, the first adhesive substances 51 are distributed in relatively scattered manner, so that other components and structures inside the mobile terminal can be dodged. The first adhesive substances 51 may occupy at least three different directions of the rear cover 13, to firmly support the rear cover 13.

When the speaker component 2 sounds, an impact airflow is flushed out from the air vent 223 of the speaker component 2, and the speaker component 2 may also vibrate under the action of a sound and the airflow. The second adhesive substance 52 connects the speaker component 2 and the rear cover 13 together. It is equivalent that a support point is added for the speaker component 2, so that when the speaker component 2 sounds, a structure of the speaker component 2 and the housing 1 synchronously withstand impact and vibration, thereby effectively damping vibration of a structure, such as the rear cover 13, of the housing 1 and the speaker component 2.

When the second adhesive substance 52 adheres the speaker component 2 to the rear cover 13, optionally, there may be a plurality of second adhesive substances 52, and the second adhesive substances 52 are disposed in diagonal parts of the speaker component 2. In this way, the second adhesive substance 52 can have a relatively good support effect for the speaker component 2, thereby preventing a single side of the speaker from vibrating to a relatively large amplitude.

A person skilled in the art may understand that, to connect the rear cover 13 and parts inside the housing 1 of the mobile terminal, a height of the adhesive substance should be greater than a height of the inner cavity 11 of the housing 1 of the mobile terminal. A specific height of the adhesive substance may be about 0.3 mm.

When the adhesive substance is formed, specifically, a liquid adhesive may be disposed on a corresponding part on the rear cover 13 in an operation manner such as gluing or dispensing, and the adhesive substance is formed through curing. The adhesive substance may be a common liquid fastening adhesive such as a UV adhesive, or an adhesive that is familiar to a person skilled in the art and that can be used for gluing or dispensing. This is not limited herein.

In this embodiment, the mobile terminal specifically includes the housing and the speaker component disposed in the inner cavity of the housing. The speaker component includes the speaker unit and the hollow accommodating cavity, the speaker unit is disposed in the accommodating cavity and divides the accommodating cavity into the front speaker box and the rear speaker box, the front speaker box is connected to the sound output hole of the housing, the air vent connected to the inner cavity is disposed on the wall of the rear speaker box, and the flexible sound absorbing member is disposed on the wall of the inner cavity of the housing. In this way, the flexible sound absorbing member can buffer an airflow generated when the speaker component sounds, thereby damping vibration of the housing.

What is claimed is:
1. A mobile terminal comprising:
   a housing comprising:
   an inner cavity comprising a first inner wall;
   a bracket disposed in the inner cavity;
   a circuit element disposed on the bracket;
   a flexible sound absorbing member disposed between the first inner wall and the bracket; and
   a sound output hole; and a speaker component disposed in the inner cavity and comprising:
   a hollow accommodating cavity comprising:
      a front speaker box coupled to the sound output hole; and
      a rear speaker box comprising a second wall;
   an air vent coupled to the inner cavity and disposed on the second wall; and
   a speaker disposed in the hollow accommodating cavity and configured to divide the hollow accommodating cavity into the front speaker box and the rear speaker box.

2. The mobile terminal of claim 1, wherein the flexible sound absorbing member comprises:
   a first side configured to abut against the bracket component; and
   a second side configured to abut against the first inner wall,
   wherein the first side is opposite to the second side.

3. The mobile terminal of claim 2, wherein at least one of the first inner wall or the bracket component is adhered to the flexible sound absorbing member.

4. The mobile terminal of claim 1, wherein the flexible sound absorbing member is disposed adjacent to the air vent.

5. The mobile terminal of claim 1, wherein the air vent faces is facing the flexible sound absorbing member.

6. The mobile terminal of claim 5, wherein the air vent is facing either a side edge of the flexible sound absorbing member or a front surface of the flexible sound absorbing member.

7. The mobile terminal of claim 1, wherein the housing further comprises a rear cover, and wherein the flexible sound absorbing member is coupled to a second inner wall of the rear cover.

8. The mobile terminal of claim 7, wherein the flexible sound absorbing member is located in a middle region of the rear cover.

9. The mobile terminal of claim 7, wherein the circuit element comprises a battery disposed on the bracket and configured to face the second inner wall, and wherein the flexible sound absorbing member is disposed between the battery and the second inner wall.

10. The mobile terminal of claim 9, wherein the flexible sound absorbing member is covering a surface of the battery facing the second inner wall.

11. The mobile terminal of claim 7, wherein the bracket component is adhered to the second inner wall with an adhesive substance, and wherein the adhesive substance comprises at least one of:
   a first adhesive substance located in an edge region of the rear cover; or
   a second adhesive substance coupled between the speaker component and the rear cover.

12. The mobile terminal of claim 11, wherein the rear cover comprises:
   a plane region comprising a peripheral edge, wherein the first adhesive substance is disposed in the plane region; and
   an arc surface region surrounding the peripheral edge,
   wherein a boundary line between the plane region and the arc surface region is adjacent to the first adhesive substance.

13. The mobile terminal of claim 12, wherein the first adhesive substance is disposed around a circumferential direction of the rear cover.

14. The mobile terminal of claim 12, further comprising a plurality of first adhesive substances each separately distributed in different directions in a circumferential direction of the rear cover.

15. The mobile terminal of claim 1, wherein the flexible sound absorbing member comprises a porous structure.

16. The mobile terminal of claim 15, wherein the flexible sound absorbing member is a sound absorbing cotton.

17. The mobile terminal of claim 1, further comprising a dust filter covering the air vent.

18. The mobile terminal of claim 1, wherein an area of the air vent is greater than or equal to 10 square millimeters ($mm^2$).

19. A housing of a terminal device comprising:
   a speaker component comprising:
      an accommodating cavity comprising:
         a front speaker box; and
         a rear speaker box comprising a first wall;
      an air vent disposed on the first wall;
      a bracket component disposed in the accommodating cavity;
      a speaker disposed in the accommodating cavity and configured to divide the accommodating cavity into the front speaker box and the rear speaker box; and
   a flexible sound absorbing member disposed between the bracket component and a second wall of an inner cavity of the housing.

20. The housing of claim 19, wherein at least one of the second wall and the bracket component is adhered to the flexible sound absorbing member.

* * * * *

UNITED STATES PATENT AND TRADEMARK OFFICE
CERTIFICATE OF CORRECTION

PATENT NO. : 12,200,157 B2
APPLICATION NO. : 17/761888
DATED : January 14, 2025
INVENTOR(S) : Shizhe Li et al.

Page 1 of 1

It is certified that error appears in the above-identified patent and that said Letters Patent is hereby corrected as shown below:

In the Claims

Claim 5, Column 23, Line 25: "faces is facing the" should read "is facing the"

Signed and Sealed this
Fourth Day of March, 2025

Coke Morgan Stewart
*Acting Director of the United States Patent and Trademark Office*